United States Patent
Lesser

(10) Patent No.: US 12,437,467 B1
(45) Date of Patent: Oct. 7, 2025

(54) SYSTEMS AND METHODS FOR SPLATTING BASED ON A CONTROLLED SAMPLING OF A THREE-DIMENSIONAL ASSET

(71) Applicant: Illuscio, Inc., Culver City, CA (US)

(72) Inventor: Stephen Lesser, Wellington (NZ)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 19/239,386

(22) Filed: Jun. 16, 2025

(51) Int. Cl.
*G06T 15/08* (2011.01)
*G06T 15/06* (2011.01)
*G06T 15/20* (2011.01)

(52) U.S. Cl.
CPC .............. *G06T 15/08* (2013.01); *G06T 15/06* (2013.01); *G06T 15/20* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 12,101,507 B2* | 9/2024 | Dore | ............... | H04N 21/2353 |
| 12,243,150 B1* | 3/2025 | Looper | ................... | G06T 15/20 |
| 12,262,099 B1* | 3/2025 | Looper | ................... | G06T 9/001 |
| 12,266,050 B1* | 4/2025 | Looper | ................... | G06T 15/20 |
| 2019/0371051 A1* | 12/2019 | Dore | ......................... | G06T 7/90 |
| 2024/0355038 A1* | 10/2024 | Supikov | ................ | G06T 15/503 |
| 2024/0355047 A1* | 10/2024 | Supikov | .................... | G06T 7/55 |
| 2025/0054224 A1* | 2/2025 | Lee | .......................... | H04N 5/05 |

OTHER PUBLICATIONS

Zhang, Ruiqi, and Jie Chen. "Mesh-Centric Gaussian Splatting for Human Avatar Modelling with Real-time Dynamic Mesh Reconstruction." Proceedings of the 32nd ACM International Conference on Multimedia. 2024. (Year: 2024).*
Tobiasz, Rafał, et al. "MeshSplats: Mesh-Based Rendering with Gaussian Splatting Initialization." arXiv preprint arXiv: 2502.07754 (2025). (Year: 2025).*

(Continued)

*Primary Examiner* — Nurun Flora
(74) *Attorney, Agent, or Firm* — Ansari Katiraei LLP; Arman Katiraei; Sadiq Ansari

(57) ABSTRACT

A splat generation system and associated methods perform splatting based on a controlled sampling of a three-dimensional (3D) asset. The controlled sampling ensures minimal coverage the 3D asset primitives and provides enhanced coverage for primitives that have greater detail or variation. The system projects rays in different directions from a set of the primitives towards a bounding volume, and detects points at which some of the projected rays intersect the bounding volume. The system defines virtual cameras in the 3D space of the 3D asset based on a set of the intersection points, and obtains the minimal and/or enhanced coverage based on one or more views of the primitives captured in images taken by the virtual cameras. The system generates a set of splats from the one or more views in the captured images with an acceptable amount of loss and with less total data than the 3D asset.

20 Claims, 8 Drawing Sheets

(56) References Cited

OTHER PUBLICATIONS

Blanc, Hugo, Jean-Emmanuel Deschaud, and Alexis Paljic. "Raygauss: Volumetric gaussian-based ray casting for photorealistic novel view synthesis." 2025 IEEE/CVF Winter Conference on Applications of Computer Vision (WACV). IEEE, 2025 (Year: 2025).*

Shao, Zhijing, et al. "Splattingavatar: Realistic real-time human avatars with mesh-embedded gaussian splatting." Proceedings of the IEEE/CVF Conference on Computer Vision and Pattern Recognition. 2024 (Year: 2024).*

* cited by examiner

SYSTEMS AND METHODS FOR SPLATTING BASED ON A CONTROLLED SAMPLING OF A THREE-DIMENSIONAL ASSET

BACKGROUND

Gaussian splatting includes obtaining a set of images that capture a three-dimensional (3D) asset from different viewpoints, determining the relative positions of the cameras used to capture the set of images, and iteratively generating and refining different sets of splats until a particular set of splats matches the visual detail in the set of images with an acceptable amount of loss. Converting the 3D asset from another format (e.g., a mesh, polygonal, or point cloud format) to a splat format typically includes capturing the surfaces or regions of the 3D asset based on a uniform or equidistant placement of virtual cameras around the 3D asset. Even though the virtual cameras are uniformly placed around the 3D asset, the resulting images may not produce an even sampling or guaranteed sampling of the 3D asset. For instance, the shape and/or curvature of some surfaces or regions may cause those surfaces or regions to be obscured from the virtual cameras or insufficiently sampled (e.g., imaged from one angle or perspective but not other angles or perspectives that may reveal additional detail about those surfaces or regions). Also, some surfaces or regions may have more detail or finer detail than other surfaces or regions due to specular differences, higher-frequency textures, and/or other variations in the surfaces or regions. For instance, a curved surface that is highly specular and has variation over the surface due to an applied high-frequency texture may require sampling from multiple views or angles in order to accurately capture the detail and variation across the curved surface, whereas a flat surface that is matte and has a single color may require sampling from a single view or angle in order to accurately capture the lesser detail and no variation across the flat surface.

FIG. 1 illustrates a prior art example of uniformly imaging a 3D asset for conversion to a splat representation. Virtual cameras are placed equally around the 3D asset. However, the equal placement of the virtual cameras around the 3D asset produces an uneven sampling of the 3D asset due to some primitives being more exposed and/or directed towards the virtual cameras than other primitives. The uneven sampling may result in a generated splat representation having greater and lesser detail in the wrong places and/or inconsistent detail across the splat representation. For instance, important detail in the 3D character face may be lost as a result of not sampling the 3D character face with more images from different views than the boots. Similarly, splats may not be generated for obscured regions that are not captured because of the equal or equidistant placement of the virtual cameras around the 3D asset.

DETAILED DESCRIPTION OF PREFERRED EMBODIMENTS

Figure 1:
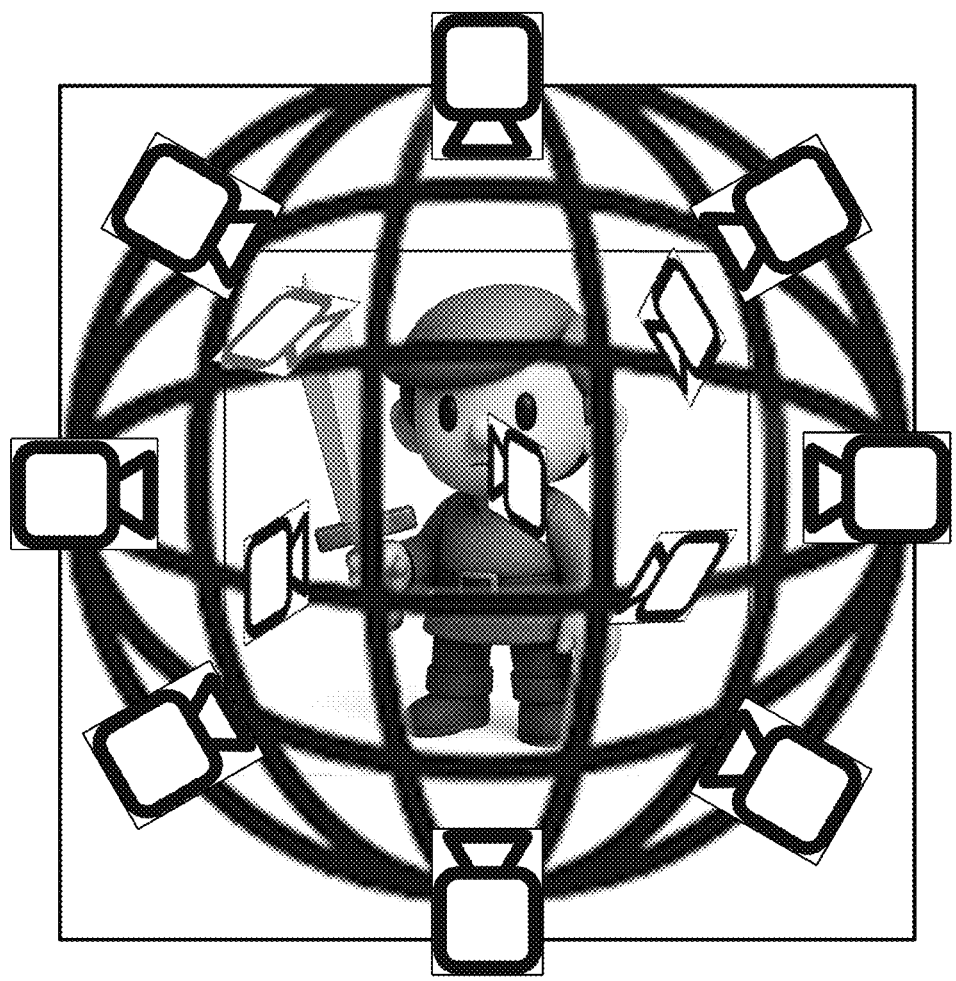
FIG. 1 illustrates a prior art example of uniformly imaging a three-dimensional (3D) asset for conversion to a splat representation.

The following detailed description refers to the accompanying drawings. The same reference numbers in different drawings may identify the same or similar elements.

Provided are systems and associated methods for splatting based on a controlled sampling of a three-dimensional (3D) asset. In some embodiments, the controlled sampling guarantees an even or prioritized sampling or imaging of the 3D asset primitives based on a dynamic non-uniform capture of the 3D asset. In some embodiments, the controlled sampling adjusts the sampling or imaging of the 3D asset primitives based on primitive priorities that are determined based on the amount of detail or variation associated with each primitive. Accordingly, the controlled sampling ensures coverage of surfaces or regions from the 3D asset that may obscured by other surfaces or regions and/or that may require additional sampling because of greater, finer, or varying detail.

In some embodiments, a splat generation system performs the controlled sampling by projecting rays outward at different angles from the primitives or surfaces of the 3D asset, detecting the rays that intersect a bounding volume that surrounds the 3D asset, and placing micro virtual cameras at the points of intersection in the direction of the projected rays to ensure coverage of the primitives associated with the rays intersecting the bounding volume. In particular, by placing the micro virtual cameras at the points of intersection, the splat generation system ensures an unobscured and centered capture of the 3D asset primitives from a specific view or angle. Moreover, the same primitive may be captured from different views by placing micro virtual cameras at points where two or more of the rays projected at different angles or direction from the same primitive intersect the bounding volume. Accordingly, the micro virtual camera images capture close-up and different views of the 3D asset primitives and surfaces.

The splat generation system uses these close-up and different views as reference data from which to generate or define the splat representation of the 3D asset. In some embodiments, the splat generation system combines the images from the micro virtual cameras to form a mosaic image that provides complete and multi-view coverage of the 3D asset regardless of its shape, and the splat generation system uses the mosaic image as the reference data from which to generate or define the splat representation of the 3D asset. In particular, the splat generation system generates one or more sets of splats that are compared against the mosaic image to determine the set of splats that are an accurate material reconstruction of the 3D asset and/or that recreate the detail captured in the close-up and different views with an acceptable amount of loss.

In some embodiments, the close-up and different views within the 3D mosaic image may not contain enough reference data for accurate shape reconstruction of the 3D asset. For instance, the 3D mosaic image and/or the individual micro virtual camera images may have little empty space for revealing the outline or the overall shape of the 3D asset or may capture views that are so close up that the outline or the overall shape of the 3D asset cannot be resolved. In some such embodiments, the splat generation system may supplement the splatting technique and/or loss function of the splatting technique with a shape comparison. The shape comparison may feed into the loss function or may be a distinct splatting iteration that repositions or adjusts the generated splats for accurate shape reconstruction.

In some embodiments, the shape comparison may include comparing the volume occupancy of the generated splats to the volume occupancy of the original primitives from the 3D asset. The volume occupancy comparison may include placing a common grid structure around the splat representation and the 3D asset and performing a voxel-by-voxel or cell-by-cell shape comparison.

Figure 2:
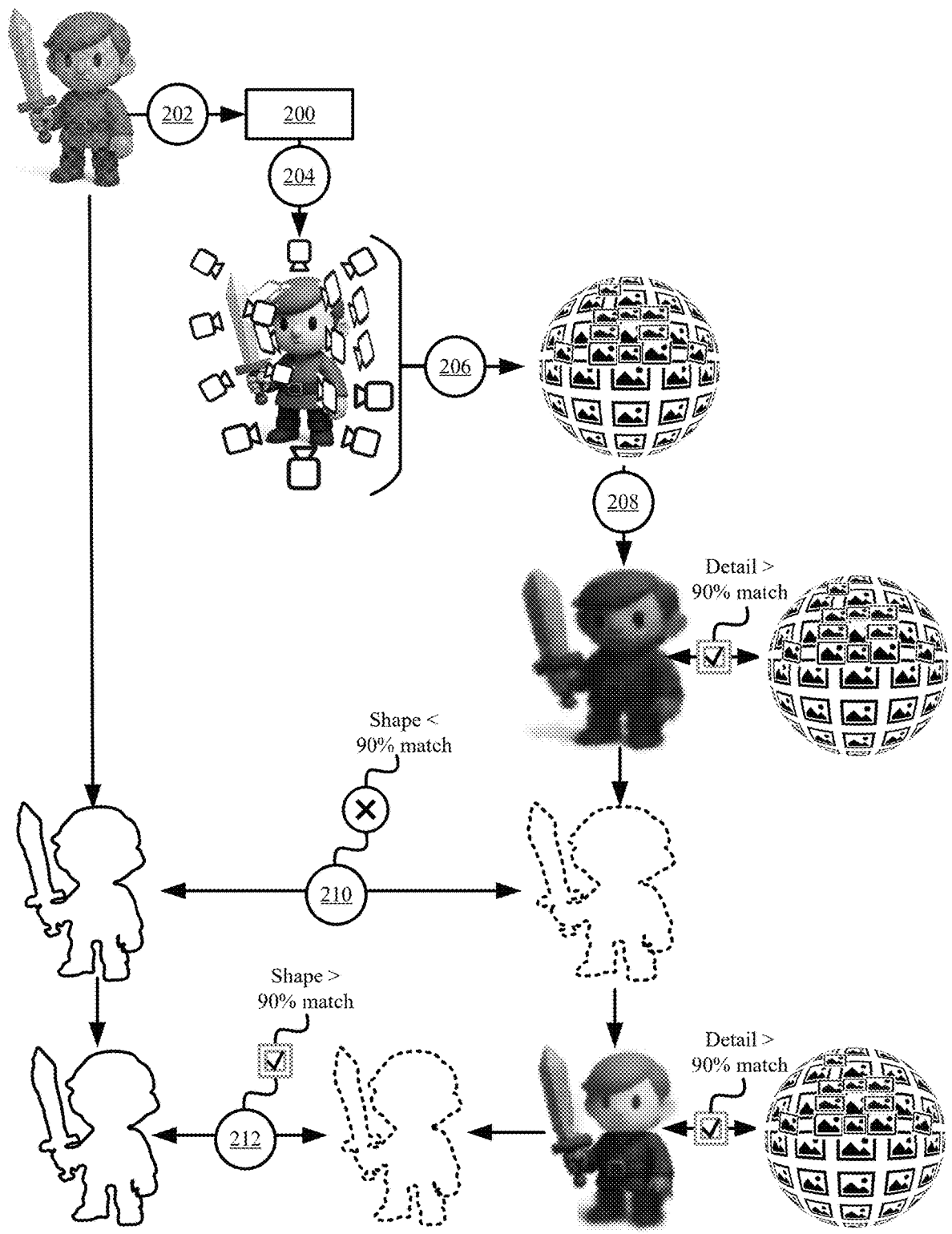
FIG. 2 illustrates an example of generating a splat representation for a 3D asset from a controlled sampling of the 3D asset and a shape comparison in accordance with some embodiments presented herein.

FIG. 2 illustrates an example of generating a splat representation for a 3D asset from a controlled sampling of the 3D asset and a shape comparison in accordance with some embodiments presented herein. Splat generation system 200 receives (at 202) the 3D asset for conversion into a 3D Gaussian splat or other splat representation.

The 3D asset may be encoded in a non-splat format such as a mesh model with a connected set of meshes or polygons that construct the 3D shape and visual characteristics of one or more objects or environments represented by the 3D asset. Alternatively, the 3D asset may be defined as a point cloud with a distributed and disconnected set of points that construct the 3D shape and visual characteristics of the one or more objects or environments represented by the 3D asset. In some embodiments, the 3D asset may be defined as implicit surfaces or with other 3D primitives. In some embodiments, the 3D asset may be defined as an unoptimized Gaussian splat representation with a high resolution that is to be reduced without noticeable quality loss as an optimized Gaussian splat representation. In some embodiments, the 3D asset is defined with multiple types of 3D primitives. For instance, the 3D asset may be defined using a combination of splats, points, and/or meshes.

Splat generation system 200 dynamically places (at 204) a set of micro virtual cameras around the 3D asset to obtain full coverage of all primitives and/or surfaces of the 3D asset and to obtain differentiated or greater coverage of primitives or surfaces that have higher detail or variation. The differentiated or greater coverage may include capturing a primitive or surface from additional views or angles than primitives or surfaces with less detail or variation. Splat generation system 200 dynamically places (at 204) the set of micro virtual cameras based on outward projection of rays from the primitives or surfaces of the 3D asset to a bounding volume. The micro virtual cameras may be placed where a projected ray intersects the bounding volume and may limit the number of micro virtual cameras that focus on the same primitives or surfaces based on an amount of variation across those primitives or surfaces.

Splat generation system 200 generates (at 206) a mosaic image of the 3D asset from the different images captured by the set of micro virtual cameras. For instance, each micro virtual camera captures one or more primitives or surfaces of the 3D asset from a distinct view, and splat generation system 200 combines or merges the different images captured by each micro virtual camera to form the mosaic or 360-degree image of the 3D asset. The mosaic image may include more images capturing some primitives or surfaces from a greater number of different views than other primitives or surfaces.

Splat generation system 200 generates (at 208) a splat representation of the 3D asset based on the mosaic image. Generating (at 208) the splat representation may include performing multiple splatting iterations with each splatting iteration generating a different set of splats that are compared against the mosaic image using a loss function. The loss function determines the accuracy with which a generated set of splats reconstruct the detail from across the mosaic image. The splatting concludes in response to generating a set of splats that matches the detail in the mosaic image with a threshold amount of loss or accuracy.

Splat generation system 200 performs (at 210) a shape comparison between the generated (at 208) splat representation and the original 3D asset. The shape comparison determines the accuracy with which the splat representation reconstructs the shape of the 3D asset.

In some embodiments, splat generation system 200 performs (at 210) the shape comparison for each set of splats that are generated (at 208) during the splatting phase, and incorporates the results of the shape comparison into the loss that is calculated by the loss function. In some such embodiments, splat generation system 200 continues with the splatting phase and generates additional sets of splats until a set of splats is generated that matches the detail in the mosaic image with the threshold amount of loss or accuracy and that matches the shape of the original 3D asset by a different shape conforming threshold. In some other embodiments, a separate loss function may be defined and/or used to perform (at 210) the shape comparison after having generated (at 208) and selected a set of splats that accurately reconstruct the detail and visual characteristics from the mosaic image.

Splat generation system 200 adjusts (at 212) the splat representation based on the shape comparison. Adjusting (at 212) the splat representation may include regenerating the set of splats to account for detected differences between the shape of the splat representation and the 3D asset or repositioning the splats to correct for the detected differences between the shape of the splat representation and the 3D asset. Regenerating the set of splats may include performing one or more additional splatting iterations until a set of splats is generated that has an accurate material reconstruction and shape reconstruction of the 3D asset. In other words, the splatting may produce different sets of splats until a set of splats is generated that satisfies an acceptable amount of loss that is set for differences in detail between the set of splats and the mosaic image and differences in shape between the set of splats and the 3D asset in one or more loss functions.

Splat generation system 200 may stream, distribute, or otherwise presents the adjusted (at 212) splat representation in response to a request for the 3D asset or for an optimized splat representation of the 3D asset. The adjusted (at 212) splat representation is encoded with less data than the original encoding of the 3D asset and recreates the shape and visual details of the 3D asset with an acceptable amount of loss. In some embodiments, splat generation system 200 stores the adjusted (at 212) splat representation for subsequent presentation to a user device. In some embodiments, splat generation system 200 modifies the loss function thresholds that are set for the detail comparison and/or for the shape comparison in order to generate different optimized splat representations that reproduce the 3D asset with different accuracy and have different sizes that are optimized for streaming over data networks with different network performance and/or for presentation on devices with different rendering resources.

Figure 3:
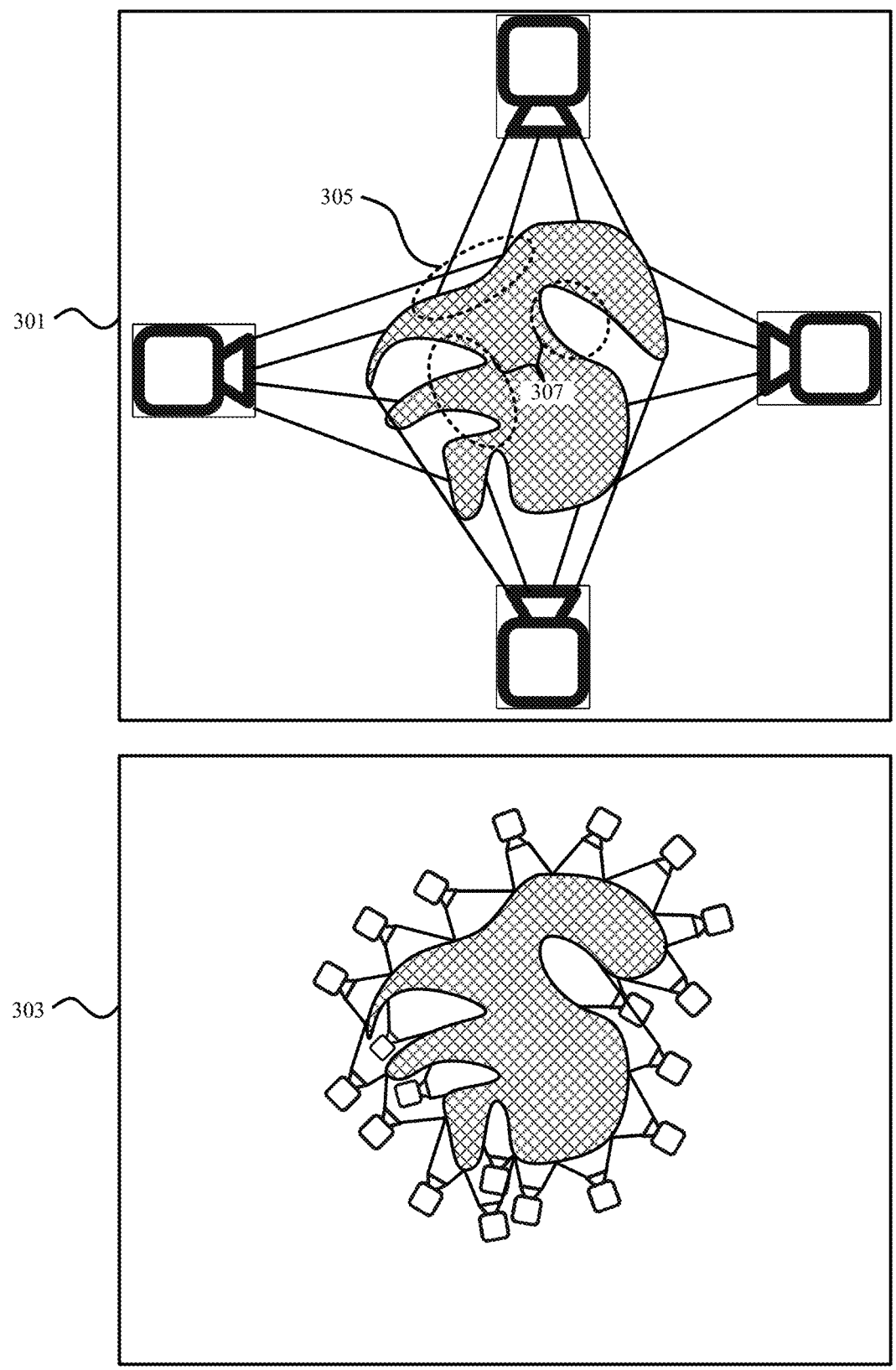
FIG. 3 illustrates a difference in coverage of a 3D asset obtained through uniform virtual camera placement of the prior art versus the dynamic non-uniform micro virtual camera placement performed by a splat generation system in accordance with some embodiments presented herein.

FIG. 3 illustrates a difference in coverage of a 3D asset obtained through uniform virtual camera placement 301 of the prior art versus the dynamic non-uniform micro virtual camera placement 303 performed by splat generation system 200 in accordance with some embodiments presented herein. For simplicity, a two dimensional view of the 3D asset is presented.

The 3D asset may have a shape that causes certain surfaces to be over-sampled and other surfaces to be under-sampled or not sampled by uniform virtual camera placement 301. For instance, some surfaces fall within the field-of-view of multiple virtual cameras (e.g., region or surface 305) and/or may obscure other surfaces (e.g., regions or surfaces 307) from falling within the field-of-view of any virtual cameras regardless of the amount of detail or variation across those surfaces. The oversampling and undersampling may also be caused by the distance of the 3D asset to the virtual cameras in the uniform virtual camera placement 301. The virtual cameras may be positioned equally about a bounding volume that surrounds the 3D asset and the 3D asset may a first surface that extends closer to one or more virtual cameras and a second surface that is farther away from the one or more virtual cameras such that the one or more virtual cameras capture more detail of the first surface and less detail of the second surface. Accordingly, uniform virtual camera placement 301 may oversample or generate more views of a surface that has less detail and variation and may undersample or generate less or no views of a surface that has greater detail and variation.

Uniform virtual camera placement 301 may also use virtual cameras that have a larger field-of-view and that image the 3D asset from a greater distance than the micro virtual cameras of dynamic non-uniform micro virtual camera placement 303. The larger field-of-view may result in uniform virtual camera placement 301 capturing less detail and/or more empty space around the 3D asset.

Dynamic non-uniform micro virtual camera placement 303 ensures complete and proper coverage of all surfaces and primitives by strategically placing the micro virtual cameras with a direct or unobstructed line-of-sight to one or more primitives or surfaces. Dynamic non-uniform micro virtual camera placement 303 varies the distance and positioning of the micro virtual cameras so that an equal baseline level-of-detail is captured for each primitive or surface regardless of its position relative to other primitives or surfaces. Moreover, the visual characteristics and/or variation associated with each primitive or surface may be accounted for when dynamically placing the micro virtual cameras of dynamic non-uniform micro virtual camera placement 303 to increase the number of samples taken of primitives or surfaces with high specularity, high frequency textures, and/or greater variation. The micro virtual cameras are smaller in size (e.g., 32×32 pixels) than the virtual cameras used for uniform virtual camera placement 301 and have a focused field-of-view that is smaller than the field-of-view than the virtual cameras used for uniform virtual camera placement 301. As a result, the micro virtual cameras capture more detail from the imaged primitives and/or surfaces of the 3D asset.

Figure 4:
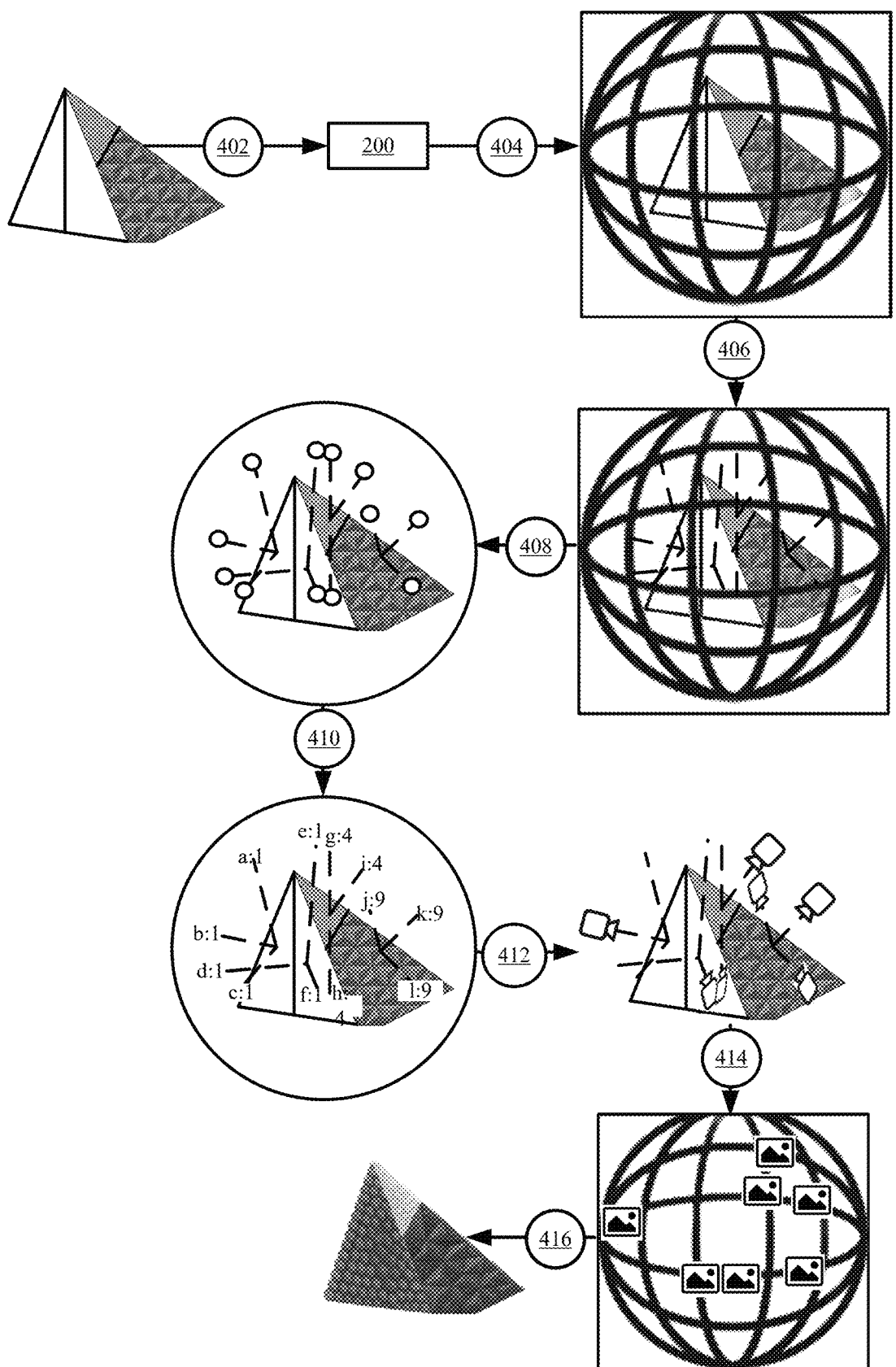
FIG. 4 illustrates an example for dynamically placing the micro virtual cameras for complete and/or controlled coverage of a 3D asset in accordance with some embodiments presented herein.

FIG. 4 illustrates an example for dynamically placing the micro virtual cameras for complete and/or controlled coverage of a 3D asset in accordance with some embodiments presented herein. Splat generation system 200 receives (at 402) a 3D asset and places (at 404) a bounding volume around the 3D asset. The bounding volume may be a sphere, cube, or other 3D shape that encompasses the entirety of the 3D asset.

Splat generation system 200 selects one or more neighboring primitives of the 3D asset. The primitives may include meshes that are connected to one another via shared vertices or points that are within a continuous region of a point cloud. Splat generation system 200 extends (at 406) multiple rays outward from the selected one or more neighboring primitives in different directions towards the bounding volume. The direction of each ray may be randomly determined or may be based off the surface normal of the one or more neighboring primitives. For instance, a first ray may be extended (at 406) from a primitive in the direction of that primitive's surface normal, a second ray may be extended (at 406) with a 30 degree positive offset from the angle of the surface normal, a third ray may be extended (at 406) with a 60 degree positive offset from the angle of the surface normal, a fourth ray may be extended (at 406) with a 30 degree negative offset from the angle of the surface normal, and a fifth ray may be extended (at 406) with a 60 degree negative offset from the angle of the surface normal.

Splat generation system 200 detects (at 408) intersection points where the rays contact the bounding volume. Some rays may be blocked from reaching the bounding volume by other primitives or surfaces of the 3D asset. However, by extending (at 406) multiple rays at different angles or directions, at least one ray projected from each primitive is expected to reach the bounding volume.

In some embodiments, splat generation system 200 assigns (at 410) a priority value to each intersection point and/or a primitive identifier. The priority value may be based on the amount of detail or variation associated with the primitive that the intersecting ray is extended (at 406) from. For instance, a higher priority value may be assigned (at 410) to a primitive that is defined with high specular properties, high reflectivity, color gradation or variation, or that has significant variation across its surface due to a high frequency texture being mapped or applied to that primitive. Primitives that have matte surfaces (e.g., little or no specular or reflectivity) or that have a single color may be assigned (at 410) a low priority value. The primitive identifier may identify the primitive from which an extended (at 406) ray intersecting the bounding volume originates from. Accordingly, the same primitive identifier may be found multiple times across the bounding volume in response to the rays projected from a particular primitive all reaching and contacting the bounding volume. The primitive identifiers about the bounding volume may be used to determine the maximum and minimum number of micro virtual cameras that cover or capture the same primitive.

Splat generation system 200 defines (at 412) a set of micro virtual cameras for a complete sampling of the 3D asset primitives based on the detected (at 408) intersection points and the assigned (at 410) priority values and primitive identifiers. In some embodiments, splat generation system 200 defines (at 412) the set of micro virtual cameras to guarantee that each primitive of the 3D asset is within the focused field-of-view of at least one micro virtual camera. In other words, each primitive is centered within an unobstructed line-of-sight of one micro virtual camera. In some other embodiments, splat generation system 200 defines (at 412) the set of micro virtual cameras so that each primitive of the 3D asset is within the focused field-of-view of two different micro virtual cameras. The two different micro virtual cameras capture the same primitive from two different angles or perspectives which provides the view-dependent detail for the splats that are generated from the images captured by the set of micro virtual cameras. Additional micro virtual cameras are placed to capture higher priority primitives or surfaces from additional views or angles. For instance, a single micro virtual camera is placed to capture matte primitives with uniform coloring from a single view, two micro virtual cameras are placed to capture primitives with some surface variation or a low frequency texture from two views, and three micro virtual cameras are placed to capture primitives with high surface variation or a high frequency texture from three views. Accordingly, the primitives or surfaces that are assigned (at 410) the higher priorities receive additional coverage and/or are captured from more views than the primitive that are assigned (at 410) the lower priorities.

When the number of rays extending from a primitive and intersecting the bounding volume is greater than the number of micro virtual cameras used to capture that primitive or is greater than the number of different images at which that primitive is captured, splat generation system 200 may define micro virtual cameras at the intersection point of whichever rays provide the most on-center or direct capture of the primitive. The on-center or direct capture may be determined based on whichever intersection points are closest to the direction or angle of the primitive surface normal.

Splat generation system 200 may define (at 412) the set of micro virtual cameras at the intersection points about the bounding volume. To guarantee coverage of a particular primitive and/or to center the particular primitive in the focused field-of-view of a particular micro virtual camera, splat generation system 200 may position the particular micro virtual camera at the position about the bounding volume where a ray extended (at 406) from the particular primitive contacts the bounding volume and may orient the particular micro virtual camera so that the camera or camera center is aligned with the angle of the ray. In particular, splat generation system 200 may define (at 412) the set of micro virtual camera to ensure that the primitive identifier for every primitive of the 3D asset is within the focused field-of-view of at least one of the set of micro virtual camera. In some embodiments, splat generation system 200 adjusts the distance or position of micro virtual camera off the bounding volume relative to a position of a targeted primitive so that all primitives are captured from the same or an about equal distance and to avoid images that capture different amounts of detail on different primitives due to the distances between the primitives and the micro virtual cameras differing.

To avoid defining (at 412) micro virtual cameras that capture only a single 3D asset primitive, splat generation system 200 may identify rays that are extended (at 408) from two or more different primitives, that intersect the bounding volume at the same location or within a threshold distance of one another, and/or that arrive with an angle that differs by less than a threshold amount (e.g., angles that are within 10 degrees of one another). Splat generation system 200 may place a micro virtual camera so that the two or more different primitives with rays extending to intersect the bounding volume within a threshold distance from one another are centered or are directly captured within the focused field-of-view of that micro virtual camera.

Splat generation system 200 generates (at 414) the mosaic image of the 3D asset based on the images captured by each micro virtual camera of the defined (at 412) set of micro virtual cameras. Generating (at 414) the mosaic image include generating an image of a different focused field-of-view that includes a different subset of the 3D asset primitives from each micro virtual camera of the set of micro virtual cameras, and combining or ordering the images from each micro virtual camera in the mosaic image to reconstruct the 3D representation of the 3D asset.

Splat generation system 200 generates (at 416) a set of splats for an accurate material reconstruction of the 3D asset based on the mosaic image. In particular, splat generation system 200 generates (at 416) the set of splats to recreate the visual characteristics, shapes, and forms in each image with a threshold amount of loss.

The mosaic image provides a zoomed-in multi-view capture of the 3D asset details. Accordingly, splat generation system 200 is able to generate the splat representation with an accurate material reconstruction of the 3D asset. Such accuracy and/or preservation of detail is not possible from a regular virtual camera capture or uniformly distributed camera capture of a 3D asset because the regular virtual camera capture and the uniformly distributed camera capture involve imaging the 3D asset from further away with virtual cameras that have a wider field-of-view. Moreover, many of the pixels from the images produced from the regular camera capture of the 3D asset capture the empty space around the 3D asset. The regular virtual camera capture or uniformly distributed camera capture of a 3D asset also cannot guarantee that regions of the 3D asset with high variability, high variation, and/or greater detail will be captured with more views providing more reference data for the splatting and material reconstruction of the 3D asset with splats than regions that contains less variability, less variation, and/or less detail.

Since the mosaic image provides the zoomed-in multi-view capture of the 3D asset primitives, it may lack reference data for the overall shape and outline of the 3D asset. In particular, the mosaic image may not capture enough of the empty space around the 3D asset to allow the splatting technique or splat generation system 200 to generate the splat representation with an accurate shape reconstruction of the 3D asset. For instance, the empty space is needed to align the edges or reconstruct the outline of the 3D asset in the mosaic image and thereby capture the 3D asset curvature or shape. The zoomed-in view obtained through the mosaic image may also lack reference data for properly determining curvature or shifting shapes between neighboring sets of primitives.

Figure 5:
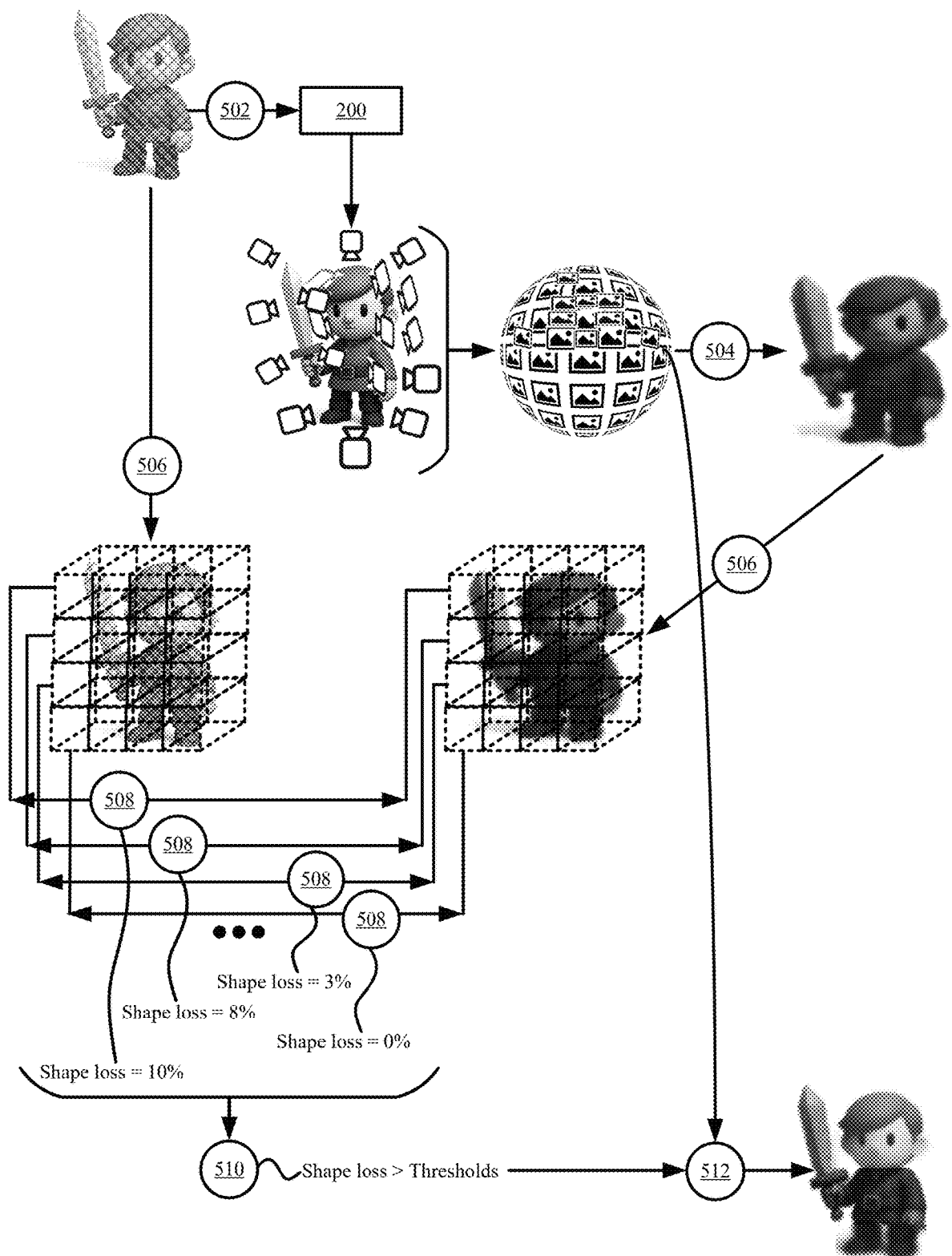
FIG. 5 illustrates an example of the shape comparison between a splat representation of a 3D asset and the 3D asset in accordance with some embodiments presented herein.

To compensate and resolve for any shape deviations, splat generation system 200 may perform a shape comparison of a splat representation and may perform a shape correction or shape adjustment after the splat representation is generated with an accurate material reconstruction of the 3D asset or as part of the splatting phase during which different sets of splats are generated and compared to the 3D asset using a loss function. FIG. 5 illustrates an example of the shape comparison between a splat representation of a 3D asset and the 3D asset in accordance with some embodiments presented herein.

Splat generation system 200 receives (at 502) the original encoding of the 3D asset. Splat generation system 200 generates (at 504) the splat representation of the 3D asset from a complete and/or controlled sampling of the 3D asset.

Specifically, splat generation system 200 generates (at 504) splats that accurately recreate the multi-view detail of the 3D asset that is captured in the mosaic image.

Splat generation system 200 places (at 506) the same volumetric grid structure or 3D grid around the splat representation and the original encoding of the 3D asset. The volumetric grid structure may partition the 3D space of the splat representation and the 3D space of the 3D asset into equally sized cells or voxels that are located at corresponding positions in 3D space.

Splat generation system 200 performs (at 508) a grid cell-by-cell or voxel-by-voxel shape comparison. In some embodiments, splat generation system 200 performs (at 508) the shape comparison at cells or voxels that include the edges or outline of the splat representation and/or 3D asset. For instance, splat generation system 200 identifies the cells or voxels containing a mix of empty space and splats or primitives. In some other embodiments, splat generation system 200 performs (at 508) the shape comparison between every corresponding pair of cells or voxels from the two volumetric grid structures.

Performing (at 508) the shape comparison may include calculating a positional or shape deviation between the splats in a selected cell or voxel and the primitives in a corresponding cell or voxel. In some embodiments, the shape deviation may be calculated based on a difference between the position and amount of empty space in the corresponding cells or voxels. In some other embodiments, the shape deviation may be calculated based on differences in cell or voxel occupancy between the splats in a cell or voxel and the primitives in the corresponding cell or voxel. The deviation from each comparison may be converted into an amount of shape loss or the total deviation from all comparison may be derived into an amount of shape.

In some embodiments, the result of the shape comparisons and/or the calculated amount positional or shape deviations are fed into the splat generation loss function. In other words, the splatting technique accounts for the positional or shape deviation as well as the visual characteristic or detail dissimilarity between the splat representation and the mosaic image in computing the loss between the splat representation and the 3D asset.

In response to the loss computed by the loss function exceeding (at 510) one or more thresholds, splat generation system 200 may perform (at 512) another splat generation iteration to generate a new or adjusted set of splats that better reconstruct the shape of the 3D asset. The splatting accounts for the shape loss in the different cells or voxels and generates the next set of splats to minimize or correct for the shape loss detected in the different cells or voxels. The generated set of splats are compared against the mosaic image to determine detail or visual characteristic loss and the cell-by-cell or voxel-by-voxel shape comparison is performed against the original 3D asset to determine the amount by which the shape of the resulting splat representation differs from the shape of the original 3D asset. Splat generation system 200 continues generating different sets of splats and comparing the detail and shape of each set of splats via the loss function until arriving at a set of splats that reconstruct the material and/or detail captured across the mosaic image that reconstruct the shape of the 3D asset with less than a threshold amount of loss.

In some other embodiments, the result of the shape comparison and/or the calculated amount of positional or shape deviation is used to directly adjust the positioning of the generated splats. For instance, splat generation system 200 may reposition, move, resize, reorient, or otherwise adjust one or more splats in a cell or voxel to better conform to the positioning of the 3D asset primitives in a corresponding cell or voxel or may reposition, move, resize, reorient, or otherwise adjust one or more splats in a cell or voxel so that the overall shape formed by the splats in that cell or voxel match or better conform to the overall shape that is formed by the 3D asset primitives in a corresponding cell or voxel. In some such embodiments, splat generation system 200 may avoid performing additional splatting iterations and repeating the mosaic image comparison, and may generate the optimized splat representation from a single iteration of adjusting the splats in each cell or voxel so that the shape deviation in that cell or voxel to a corresponding cell or voxel of the 3D asset is less than a threshold amount.

Figure 6:
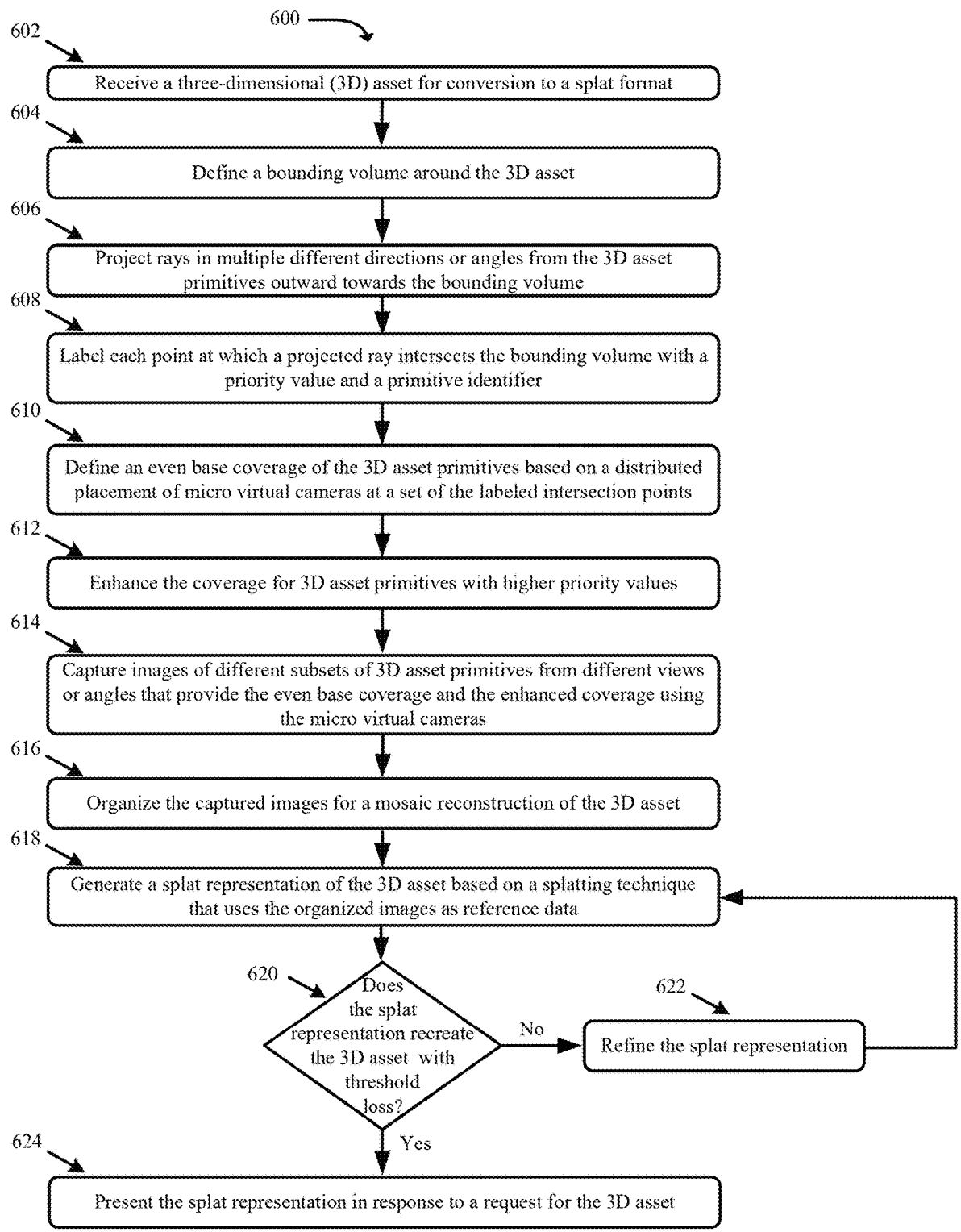
FIG. 6 presents a process for generating a splat representation of a 3D asset based on a controlled sampling of the 3D asset in accordance with some embodiments.

FIG. 6 presents a process 600 for generating a splat representation of a 3D asset based on a controlled sampling of the 3D asset in accordance with some embodiments. Process 600 is implemented by splat generation system 200. Splat generation system 200 includes one or more devices or machines with processor, memory, storage, network, and/or other hardware resources for the conversion of a 3D asset into an optimized Gaussian splat or other splat format. In some embodiments, splat generation system 200 is part of a streaming service that streams real-time 3D experiences such as 3D games, 3D movies, virtual, mixed, or enhanced reality experiences, and/or other spatial computing experiences over a data network to one or more client devices. In some such embodiments, the original encoding or format of the 3D asset may be too large or otherwise unoptimized for a continuous or uninterrupted streaming experience. Accordingly, splat generation system 200 may convert the 3D asset to the optimized splat format in order to reduce the size of the 3D asset while maintaining the dimensionality and level-of-detail and to optimize the splat format for different network performance.

Process 600 includes receiving (at 602) a 3D asset for conversion to a splat format. In some embodiments, the 3D asset may be encoded or defined as a mesh model, point cloud, or other non-splat format. For instance, the primitives of the 3D asset may include connected sets of meshes or distributed sets of points that collectively create the shape and visual characteristics of the 3D asset. In some other embodiments, the 3D asset may be encoded or defined as a high fidelity splat representation. In some such embodiments, the 3D asset may be provided for conversion to a lower fidelity and smaller splat representation that is optimized for streaming over a data network.

Receiving (at 602) the 3D asset for conversion may include receiving parameters for generating the optimized splat format. The parameters may specify a desired file size for the resulting splat representation or an acceptable amount of loss for converting the 3D asset to a splat representation.

Process 600 includes defining (at 604) a bounding volume around the 3D asset. The bounding volume may include a sphere, cube, or other 3D shape that fully encompasses the 3D asset.

Process 600 includes projecting (at 606) rays in multiple different directions or angles from the 3D asset primitives outward towards the bounding volume. In some embodiments, splat generation system 200 projects (at 606) the rays from each primitive of the 3D asset. In some other embodiments, splat generation system 200 projects (at 606) the rays from a neighboring set of primitives. A neighboring set of primitives may include meshes that are connected to one another and that have visual characteristics and/or positional commonality that indicates that the meshes form or are part of a common surface or feature of the 3D asset.

Process 600 includes labeling (at 608) each point at which a projected (at 606) ray intersects or contacts the bounding volume with a priority value and a primitive identifier. The priority value is defined based on the amount of variation or visual detail that is associated with the one or more primitives that the intersecting ray is projected (at 606) from and the primitive identifier uniquely identifies the one or more primitives from which the intersecting ray originates. The amount of variation or visual detail that is associated with the one or more primitives may be determined based on the number of distinct colors or color variation defined across the surface formed by the one or more primitives, based on the reflectivity, specular, opacity, and/or other properties of the one or more primitives that may change the visualization of the one or more primitives from different views, based on the frequency or variation introduced by textures that are mapped to the surface formed by the one or more primitives, and/or other variation that may be defined in the positional and visual characteristic properties of the one or more primitives.

Process 600 includes defining (at 610) an even base coverage of the 3D asset primitives based on a distributed placement of micro virtual cameras at a set of the labeled (at 608) intersection points. The even base coverage provides and/or guarantees a minimum number of views from which to capture each 3D asset primitive. Accordingly, defining (at 610) the even base coverage may include ensuring each 3D asset primitive is in the focused field-of-view of a same number of micro virtual cameras (e.g., one, two, etc.). For instance, for a minimal coverage that involves each 3D asset primitive being captured from two distinct views, splat generation system 200 places the micro virtual cameras so that the primitive identifier of each 3D asset primitive is in the focused field-of-view of two different micro virtual cameras. The micro virtual cameras are defined in the same 3D space as the 3D asset. In cases where the of rays projected from a particular primitives have more intersection points than the number of views needed for the even base coverage, splat generation system 200 may select a subset of the intersection points at which to place the micro virtual cameras. The selection may be based on which intersection points provide the clearest or most direct views of the primitives or the intersection points that provide the greatest difference in views. For instance, splat generation system 200 may select the intersection points that capture a primitive from the left and right sides rather than intersection points that capture the primitive from different offsets about the same left side.

Splat generation system 200 may place the micro virtual cameras about the bounding volume where two projected rays from each 3D asset intersect the bounding volume, and orienting the micro virtual cameras in the direction of one or more projected rays that intersect the bounding volume at the micro virtual camera position. Splat generation system 200 may adjust the placement of the micro virtual cameras to ensure that each camera is the same distance or a threshold distance away from the one or more primitives in the focused field-of-view of that micro virtual camera so that the primitives are captured with the same level-of-detail. Accordingly, the micro virtual cameras need not be placed at the intersection point of a ray and the bounding volume. Instead, the micro virtual cameras may be placed closer to or farther from the 3D asset depending on the position of the primitives about the 3D asset.

Process 600 includes enhancing (at 612) the coverage for 3D asset primitives with higher priority values. Enhancing (at 612) the coverage includes adding virtual micro cameras or adjusting the distributed placement of micro virtual cameras to capture the 3D asset primitives with higher priority values from additional views. The additional view may preserve or capture additional detail or variation of the 3D asset primitives that may not visible from the minimal number of views captured from the original distributed placement of micro virtual cameras. The number of additional view with which to a capture a particular primitive may be based on the priority value associated with the particular primitive and the number of rays that are projected from the particular primitive and that intersect the bounding volume.

Process 600 includes capturing (at 614) images of different subsets of 3D asset primitives from different views or angles that provide the even base coverage and the enhanced coverage using the micro virtual cameras. The micro virtual cameras have a focused field-of-view that provides a detailed, high fidelity, and/or close-up capture of one or more 3D asset primitives in the focused field-of-view.

Process 600 includes organizing (at 616) the captured (at 614) images for a mosaic reconstruction of the 3D asset. Organizing (at 616) the captured (at 614) the images may include identifying the position at which each image is taken, identifying images that capture the same 3D asset primitives from different views or angles, and arranging the images in the mosaic image for a detailed material reconstruction that presents the 3D asset primitives from the different views or angles.

Process 600 includes generating (at 618) a splat representation of the 3D asset based on a splatting technique that uses the organized (at 616) images as reference data. The splatting technique generates a set of splats to recreate the detail and/or visual variation captured in the images. Each splat may be defined with (x,y,z) coordinates, a covariance matrix that stores a scaling value for the radius or shape of the splat, orientation or rotational information, and/or other shape or positional parameters of the splat, and/or spherical harmonics that represent some visual characteristics of the splat.

Process 600 includes determining (at 620) whether the splat representation recreates the 3D asset with an acceptable amount of loss. In particular, splat generation system 200 determines (at 620) whether the splat representation is an accurate material reconstruction and shape reconstruction of the 3D asset. The determination (at 620) is made using a loss function. The loss function performs a material comparison and a shape comparison.

The material comparison includes computing an amount of loss in detail between the generated set of splats and the mosaic image. The amount of loss in detail may be based on a calculated amount by which the visualizations created by the set of splats deviate or vary from the 3D asset visualizations captured in the mosaic image. Splat generation system 200 may render the set of splats in order to compare against the mosaic image and detect the differences in detail between the visualizations.

The shape comparison includes computing an amount of loss between the overall shape created by the set of splats and the overall shape of the 3D asset. The shape comparison may include placing the same volumetric grid structure over the splat representation and the 3D asset and computing loss based on differences in a corresponding cells or voxels of the volumetric grid structure over the splat representation and the volumetric grid structure over the 3D asset. In particular, splat generation system 200 quantifies an amount by which shapes created by splats in a cell or voxel differ from shapes created by 3D asset primitives in a corresponding cell or voxel.

In response to determining (at 620—No) that the splat representation does not recreate the 3D asset with the acceptable amount of loss, process 600 includes refining (at 622) the splat representation. In some embodiments, refining (at 622) the splat representation includes iteratively generating an adjusted set of splats that reduces or minimizes the loss detected during the material comparison and/or the shape comparison, computing the loss associated with the adjusted set of splats using the loss function, and continuing with the splatting iterations until a set of splats is generated with loss that does not exceed the one or more loss thresholds and is therefore an accurate material and shape reconstruction of the 3D asset. In some such embodiments, the splatting may account for the material comparison and the shape comparison results, and may regenerate or adjust the generated splats where the material comparison or the shape comparison detected loss in excess of the one or more thresholds. In some other embodiments, refining (at 622) the splat representation includes redefining one or more splats from the previous set of splats based on loss detected during the material comparison or the shape comparison and/or redefining the one or more splats to improve the material reconstruction and/or the shape reconstruction of the 3D asset based on loss that was detected in a prior splat generation iteration. Redefining the one or more splats may include changing the positioning, size, orientation, and/or changing the visual characteristics of the one or more splats to more accurately recreate detail for one or more surfaces captured in the mosaic image or to better recreate the shape of the one or more surfaces.

In response to determining (at 620—Yes) that the splat representation does recreate the 3D asset with the acceptable amount of loss, process 600 includes presenting (at 624) the splat representation in response to a request for the 3D asset. In some embodiments, presenting (at 624) the splat representation includes loading and/or rendering the splat representation instead of the 3D asset. In some other embodiments, presenting (at 624) the splat representation includes streaming or distributing the splat representation instead of the original encoding of the 3D asset to a client device over a data network in response to a request for the splat representation or the 3D asset from the client device.

Splat generation system 200 may modify the controlled sampling to produce a mosaic image that is optimized for different Graphical Processing Units (GPUs) and/or Accelerated Processing Units (APUs). In some embodiments, modifying the controlled sampling may include sizing or splitting the mosaic image to optimal image sizes supported by the GPUs or APUs. In some such embodiments, splat generation system 200 may adjust the number of micro virtual cameras used to generate the mosaic image or may adjust the resolution of the micro virtual cameras so that the total size or resolution of the mosaic image is one that may be hardware accelerated, rendered efficiently, or stored entirely in the GPU or APU memory or buffers in order to accelerate the material and/or shape comparisons. In some embodiments, the optimal image size supported by a GPU or APU is dependent on the amount of available Video Random Access Memory (VRAM) or other memory.

Figure 7:
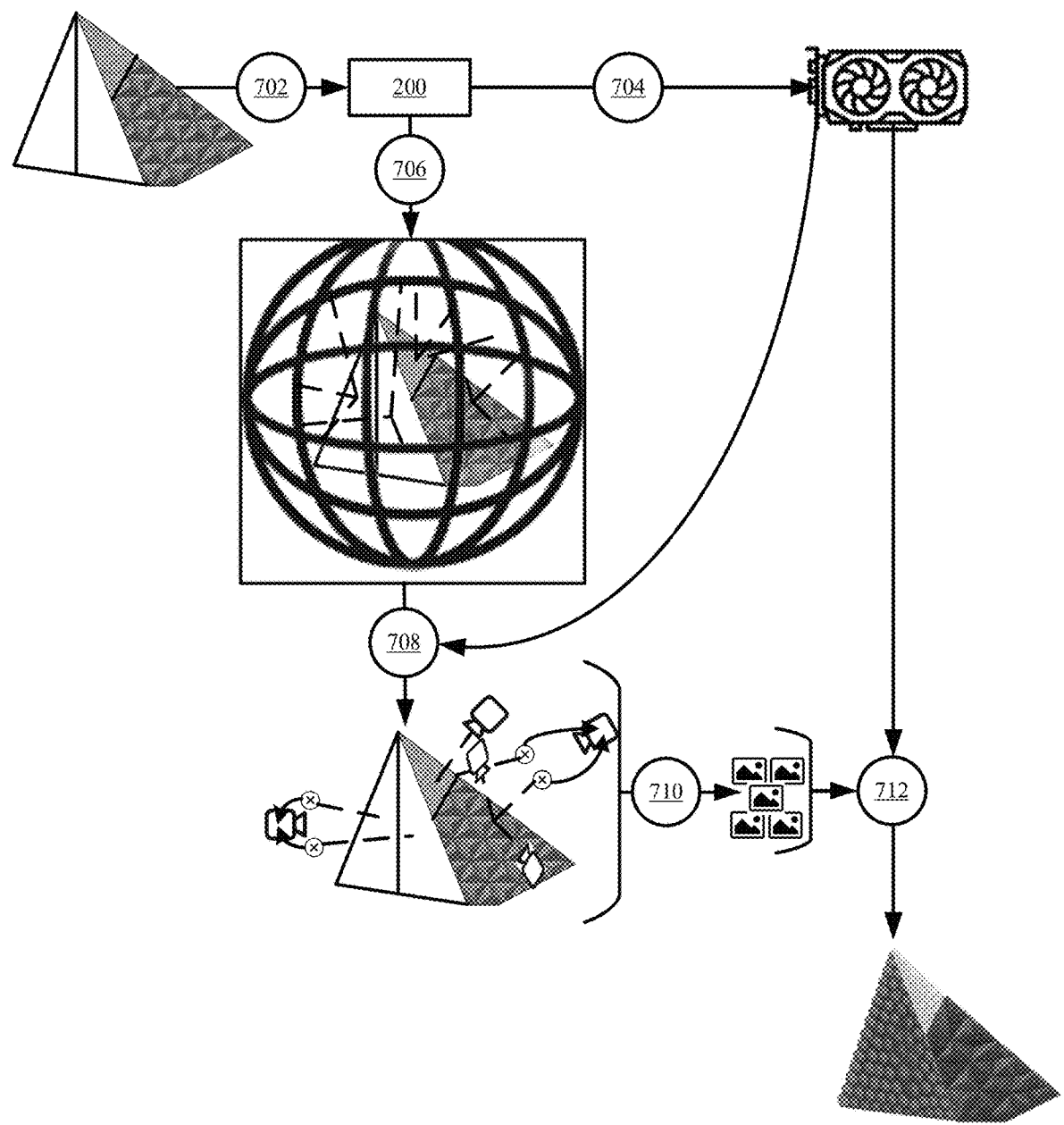
FIG. 7 illustrates an example of modifying the controlled sampling for a Graphical Processing Unit (GPU) or an Accelerated Processing Unit (APU) in accordance with some embodiments presented herein.

FIG. 7 illustrates an example of modifying the controlled sampling for a GPU or APU in accordance with some embodiments presented herein. Splat generation system 200 receives (at 702) a 3D asset for conversion.

Splat generation system 200 queries (at 704) the device hardware for an optimal image size. In particular, splat generation system 200 may query (at 704) GPUs or APUs that are available or used for the splat generation and/or loss computation. The optimal image size may correspond to the maximum image size that may be hardware accelerated, rendered, or stored entirely within the GPU or APU using only GPU or APU resources. Setting the mosaic image size to not exceed the optimal image size accelerates the splat generation and/or loss computation since the mosaic image is generated and compared to the rendered splat representation in order to quantify the loss between the splat representation and the 3D asset.

Splat generation system 200 projects (at 706) the different rays from the 3D asset primitives to a bounding volume, and defines (at 708) the set of micro virtual cameras to provide a GPU or API optimized sampling of the 3D asset primitives that produces a mosaic image that is within the optimal image size. In some embodiments, defining (at 708) the set of micro virtual cameras includes increasing or decreasing the number of micro virtual cameras that are used to generate the GPU or API optimized sampling based on the optimal image size. For instance, splat generation system 200 may decrease the number of micro virtual cameras in the set of micro virtual cameras by placing each micro virtual camera at positions about the bounding volume where there are higher concentrations of intersecting rays so that more primitives are within the focused field-of-view of each micro virtual camera. In some embodiments, defining (at 708) the set of micro virtual cameras includes adjusting the resolution at which each micro virtual cameras images a part of the 3D asset. In some embodiments, defining (at 708) the set of micro virtual cameras includes increasing the distance between the micro virtual cameras and the 3D asset or expanding the micro virtual camera field-of-view so that more 3D primitives are captured in a single image. In still some other embodiments, defining (at 708) the set of micro virtual cameras includes adjusting the resolution or size of the mosaic image that is generated from the individual images of the set of micro virtual cameras.

Splat generation system 200 generates (at 710) a mosaic image that is equal to or less than the optimal size by combining the images generated by the set of micro virtual cameras. Splat generation system 200 generates (at 712) the splat representation of the 3D asset using the device GPU or APU and the optimal sized mosaic image.

Figure 8:
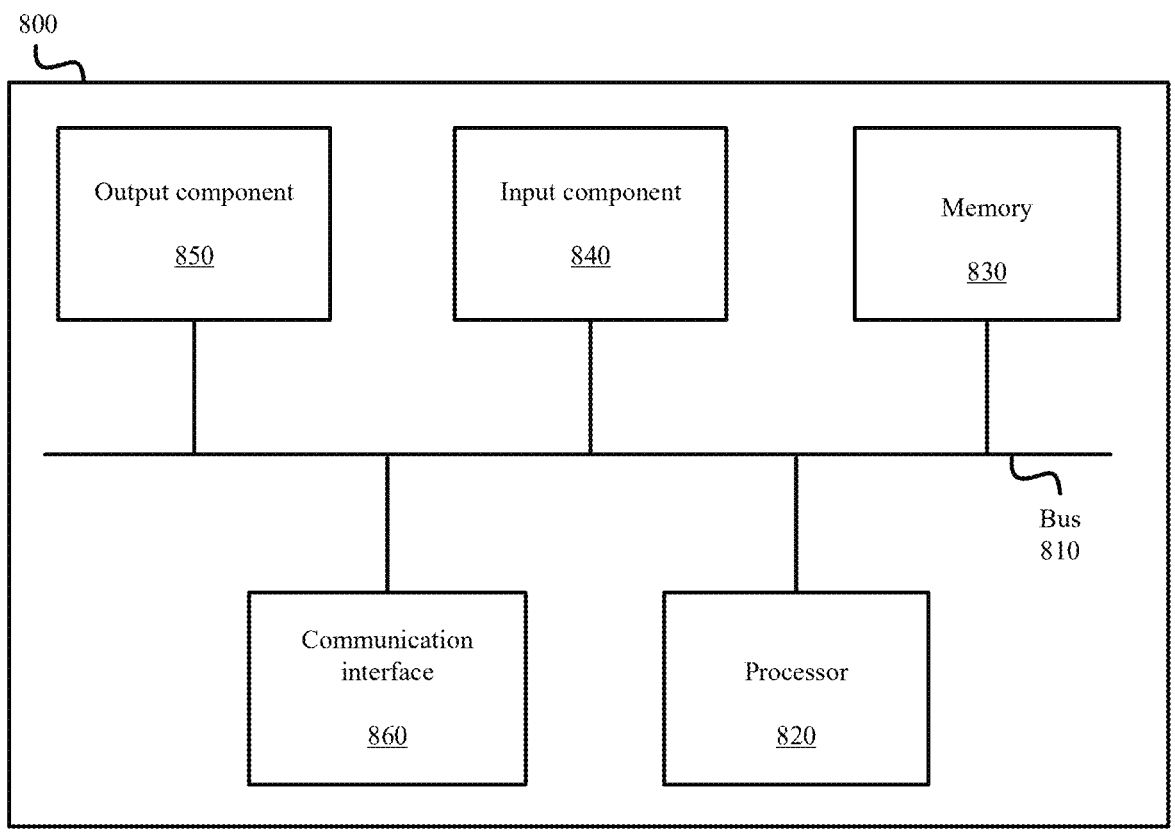
FIG. 8 illustrates example components of one or more devices, according to one or more embodiments described herein.

FIG. 8 is a diagram of example components of device 800. Device 800 may be used to implement one or more of the tools, devices, or systems described above (e.g., splat generation system 200). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a three-dimensional (3D) asset comprising a plurality of primitives defined in a 3D space;
   projecting a plurality of rays in different directions from at least a set of primitives from the plurality of primitives towards a bounding volume;
   detecting a plurality of points at which a different set of the plurality of rays projected from each primitive of the set of primitives intersects the bounding volume;
   defining a plurality of virtual cameras in the 3D space based on a set of points from the plurality of points;
   capturing the plurality of primitives from one or more views based on a plurality of images generated from the plurality of virtual cameras; and generating a set of splats that recreate details from the one or more views with an acceptable amount of loss and with less total data than the plurality of primitives based on image data that is captured in the plurality of images.

2. The method of claim 1 further comprising:
labeling each particular point of the plurality of points with an identifier of a particular primitive from which a projected ray intersects the bounding volume at the particular point.

3. The method of claim 2 further comprising:
selecting the set of points from the plurality of points to include one point with the identifier of each primitive from the plurality of primitives such that each primitive is captured in at least one image of the plurality of images.

4. The method of claim 2 further comprising:
selecting the set of points from the plurality of points to include two points with the identifier of each primitive from the plurality of primitives such that each primitive is captured from at least two views in at least two images of the plurality of images.

5. The method of claim 2 further comprising:
determining an amount of variation associated with each primitive of the plurality of primitives; and
labeling each specific point of the plurality of points with a value that is based on the amount of variation associated with a primitive from which a projected ray intersects the bounding volume at the specific point.

6. The method of claim 1 further comprising:
labeling each particular point of the plurality of points with an identifier of a particular primitive from which a projected ray intersects the bounding volume at the particular point and with a value based on an amount of variation that is associated with the particular primitive; and
wherein defining the plurality of virtual cameras comprises:
  setting a virtual camera at a first number of points from the plurality of points with the identifier of the particular primitive based on the value being a first value for a first amount of variation; and
  setting a virtual camera at a second number of points from the plurality of points with the identifier of the particular primitive based on the value being a second value for a second amount of variation.

7. The method of claim 1, wherein defining the plurality of virtual cameras comprises:
setting the plurality of virtual cameras to capture a particular primitive of the plurality of primitives from a first number of views in response to detecting a first amount of variation associated with the particular primitive; and
setting the plurality of virtual cameras to capture the particular primitive from a different second number of views in response to detecting a different second amount of variation associated with the particular primitive.

8. The method of claim 1, wherein generating the set of splats comprises:
generating a first set of splats;
comparing a visualization of the first set of splats against the plurality of images;
determining that an amount of loss between the visualization and the plurality of images exceeds one or more thresholds; and
generating a second set of splats that reduces the amount of loss between a visualization of the second set of splats and the plurality of images to be within the one or more thresholds.

9. The method of claim 1, wherein generating the set of splats comprises:
generating a first set of splats;
comparing a shape generated from the first set of splats against a shape of the 3D asset; and
generating a modified first set of splats by adjusting one or more of the first set of splats that cause the shape generated from the first set of splats to deviate by more than a threshold amount from the shape of the 3D asset.

10. The method of claim 9, wherein comparing the shape comprises:
placing a common grid structure over the first set of splats and the 3D asset; and
comparing shapes in each cell or voxel of the common grid structure over the first set of splats to a corresponding cell or voxel of the common grid structure over the 3D asset.

11. The method of claim 1 further comprising:
computing an amount of loss between the set of splats and the 3D asset based on a first comparison between detail that is recreated by the set of splats and detail that is captured in the plurality of images and a second comparison between a shape formed by the set of splats and a shape of the 3D asset.

12. The method of claim 11, wherein generating the set of splats comprises:
determining that the amount of loss from one or more of the first comparison and the second comparison exceeds one or more thresholds; and
generating a modified set of splats that reduces the amount of loss.

13. The method of claim 12, wherein generating the modified set of splats comprises:
performing another splatting iteration that generates a different second set of splats based on the plurality of images and shape deviations detected during the second comparison.

14. The method of claim 12, wherein generating the modified set of splats comprises:
adjusting one or more of a position, size, orientation, or visual characteristics of one or more of the set of splats that deviate from the shape of the 3D asset.

15. A splat generation system comprising:
one or more hardware processors configured to:
  receive a three-dimensional (3D) asset comprising a plurality of primitives defined in a 3D space;
  project a plurality of rays in different directions from at least a set of primitives from the plurality of primitives towards a bounding volume;
  detect a plurality of points at which a different set of the plurality of rays projected from each primitive of the set of primitives intersects the bounding volume;
  define a plurality of virtual cameras in the 3D space based on a set of points from the plurality of points;
  capture the plurality of primitives from one or more views based on a plurality of images generated from the plurality of virtual cameras; and
  generate a set of splats that recreate details from the one or more views with an acceptable amount of loss and with less total data than the plurality of primitives based on image data that is captured in the plurality of images.

16. The splat generation system of claim 15, wherein the one or more hardware processors are further configured to:
label each particular point of the plurality of points with an identifier of a particular primitive from which a projected ray intersects the bounding volume at the particular point.

17. The splat generation system of claim 16, wherein the one or more hardware processors are further configured to:
select the set of points from the plurality of points to include one point with the identifier of each primitive from the plurality of primitives such that each primitive is captured in at least one image of the plurality of images.

18. The splat generation system of claim 16, wherein the one or more hardware processors are further configured to:
select the set of points from the plurality of points to include two points with the identifier of each primitive from the plurality of primitives such that each primitive is captured from at least two views in at least two images of the plurality of images.

19. The splat generation system of claim 16, wherein the one or more hardware processors are further configured to:
determine an amount of variation associated with each primitive of the plurality of primitives; and
label each specific point of the plurality of points with a value that is based on the amount of variation associated with a primitive from which a projected ray intersects the bounding volume at the specific point.

20. A non-transitory computer-readable medium storing instructions that, when executed by one or more processors of a splat generation system, cause the splat generation system to perform operations comprising:
receiving a three-dimensional (3D) asset comprising a plurality of primitives defined in a 3D space;
projecting a plurality of rays in different directions from at least a set of primitives from the plurality of primitives towards a bounding volume;
detecting a plurality of points at which a different set of the plurality of rays projected from each primitive of the set of primitives intersects the bounding volume;
defining a plurality of virtual cameras in the 3D space based on a set of points from the plurality of points;
capturing the plurality of primitives from one or more views based on a plurality of images generated from the plurality of virtual cameras; and
generating a set of splats that recreate details from the one or more views with an acceptable amount of loss and with less total data than the plurality of primitives based on image data that is captured in the plurality of images.

\* \* \* \* \*